United States Patent
Song et al.

(10) Patent No.: US 9,250,622 B2
(45) Date of Patent: Feb. 2, 2016

(54) SYSTEM AND METHOD FOR OPERATING A SMART SERVICE ROBOT

(75) Inventors: Se Kyong Song, Seongnam-si (KR); Myung Kyun Lee, Yongin-si (KR); Young Jin Jun, Yongin-si (KR); Jun Young Lee, Seoul (KR)

(73) Assignee: Se Kyong Song, Seongnam (KR)

( * ) Notice: Subject to any disclaimer, the term of this patent is extended or adjusted under 35 U.S.C. 154(b) by 62 days.

(21) Appl. No.: 14/122,012

(22) PCT Filed: May 11, 2012

(86) PCT No.: PCT/KR2012/003695
§ 371 (c)(1),
(2), (4) Date: Nov. 25, 2013

(87) PCT Pub. No.: WO2012/161440
PCT Pub. Date: Nov. 29, 2012

(65) Prior Publication Data
US 2014/0136302 A1    May 15, 2014

(30) Foreign Application Priority Data

May 25, 2011  (KR) ........................ 10 2011 0049296

(51) Int. Cl.
*G06F 19/00*    (2011.01)
*G05B 19/418*   (2006.01)
*B25J 9/16*     (2006.01)

(52) U.S. Cl.
CPC ........... *G05B 19/4185* (2013.01); *B25J 9/1656* (2013.01); *G05B 2219/31422* (2013.01)

(58) Field of Classification Search
CPC .............. B25J 9/1656; G05B 19/4185; G05B 2219/31422; G06N 5/022; G06Q 10/00; G06F 11/0793; G06F 17/30047

USPC .......... 700/245; 705/14.4, 26.4, 27.1; 706/46; 901/50, 1, 47; 701/408; 318/568.12; 707/706

See application file for complete search history.

(56) References Cited

U.S. PATENT DOCUMENTS 6,292,714 B1 *  9/2001  Okabayashi .................. 700/245
8,295,979 B2 * 10/2012  Thacher et al. ............... 700/250

(Continued)

FOREIGN PATENT DOCUMENTS

| JP | 2004-237432 A | 8/2004 |
| JP | 2005-319526 A | 11/2005 |
| KR | 10-2008-0107553 A | 12/2008 |
| KR | 10-2010-0137847 A | 12/2010 |

OTHER PUBLICATIONS

International Search Report for International Application No. PCT/KR2012/003895.

*Primary Examiner* — McDieunel Marc
(74) *Attorney, Agent, or Firm* — LRK Patent Law Firm

(57) ABSTRACT

A system and method for operating a smart service robot includes: an integrated control server for storing and managing a plurality of service applications and providing a relevant service application according to a service application request from an intelligent service robot; and the intelligent service robot for requesting a specific service application from the integrated control server and downloading the application in order to provide a corresponding service. Accordingly, when a user using the intelligent service robot needs an application which is related to the operation of the intelligent service robot and which is for a specific purpose, the application for the specific purpose is easily downloaded online in order to be applied to the intelligent service robot of the user. Thus, the services that the robot provides are optimized for certain purposes and used.

21 Claims, 3 Drawing Sheets

(56) References Cited

U.S. PATENT DOCUMENTS

| | | |
|---|---|---|
| 8,935,005 B2 * | 1/2015 | Rosenstein et al. ............ 700/259 |
| 8,965,579 B2 * | 2/2015 | Wang et al. .................... 700/259 |
| 8,996,171 B2 * | 3/2015 | Anderson et al. .............. 700/253 |
| 2001/0001318 A1 * | 5/2001 | Kamiya et al. ................. 700/246 |
| 2011/0166701 A1 * | 7/2011 | Thacher et al. ................ 700/245 |
| 2011/0190931 A1 * | 8/2011 | Anderson et al. .............. 700/253 |
| 2013/0290234 A1 * | 10/2013 | Harris et al. ..................... 706/46 |
| 2014/0172909 A1 * | 6/2014 | Park et al. ...................... 707/769 |

\* cited by examiner

SYSTEM AND METHOD FOR OPERATING A SMART SERVICE ROBOT

TECHNICAL FIELD

The present invention relates to a system and a method for operating a smart service robot, and more particularly, to a system and a method for operating a smart service robot in which when an intelligent service robot requests a service application for the service to an integrated control server at the time when a new robot service is required in a field, the integrated control server provides the corresponding service application and the intelligent service robot provides services suitable for various environments and usages by using the service application downloaded from the integrated control server.

BACKGROUND ART

A service or a content for a specific purpose is required to operate an intelligent robot according to various environments and usages and a development tool is particularly required to efficiently develop the service or the content. The development tool up to now as a dependent form which can be used for the corresponding robot has been primarily developed and used by a robot manufacturer as necessary.

Due to such a reason, the development tool for developing the content or the service of the intelligent robot is used in an extremely limited range only by a specific robot and spread or business cannot be achieved through propagation of the development tool itself.

Development and propagation of a robot service integration and development environment that can ease development and propagation of the service application are acutely required to mount and activate a robot industry as new growth power.

Further, in related art, the development tool for developing the service or the content of the intelligent robot is developed in a form dependent on each robot, and as a result, the development tool cannot be used for developing services or contents of other robots. A high-cost and low-efficiency structure robot service integration and development environment is actually used, which cannot develop robot services which will be diversified as many as personalities of persons hereafter.

DETAILED DESCRIPTION OF THE INVENTION

Technical Problem

The present invention is contrived to solve the problem and an object of the present invention is to a system and a method for operating a smart service robot in which a user who is using an intelligent service robot easily downloads a service application for a specific purpose associated with an operation of the intelligent service robot online and executes the downloaded service application through an application execution engine incorporated in the robot to provide a service optimized for various environments and usages.

Another object of the present invention is to provide a system and a method for operating a smart service which can be used as various intelligent robots such as various services, for example, a guide assistant robot, an entertainment robot, an education robot, an advertising publicity robot, a security robot, an event assistant robot, a robot MC, and the like by using one intelligent service robot.

Yet another object of the present invention is to provide a system and a method for operating a smart service robot that develop a robot service integration and development environment capable of making a database of various service applications optimized for an actual condition of a service field according to user's needs, storing and evaluating, managing and updating the various service applications regardless of a feature of a robot, and create business through propagation and spread of the robot service integration and development environment to activate a robot industry.

Means for Solving Problem

According to an aspect of the present invention, there is provided a system for operating a smart service robot, including: an integrated control server storing and managing a plurality of service applications, and providing a corresponding service application according to a service application request from an intelligent service robot; and an intelligent service robot requesting and downloading a specific service application onto the integrated control server to provide the corresponding service.

The integrated control server receives operating result and state information for each service application from each intelligent service robot, and stores and statistically digitizes the result and state information and calculates and adjusts a priority of services performed by the intelligent service robot 100 by evaluating satisfaction, utilization, and conformity for the services to continuously update and manage an optimal service application suitable for a context.

The integrated control server judges whether corresponding service application identification information is present in an application database according to a service application request from the intelligent service robot and acquires the service application from the application database and provides the acquired service application to the intelligent service robot when the corresponding service application identification information is present in the application database.

The integrated control server outputs a service application registration request signal to request new registration of the service application when the corresponding service application identification information is not present in the application database.

The integrated control server maps a service scenario application and a content application newly prepared by an operator or a provider with the service application identification information to register the mapped service scenario application and content application, and the service application identification information in the application database.

According to another aspect of the present invention, there is provided an intelligent service robot, including: a communication unit performing communication with an integrated control server through a communication network; a storage unit storing service applications downloaded from the integrated control server through the communication unit; a user interface unit receiving a service application downloading request command from a user; an application updating unit transmitting, when the service application downloading request command is input through the user interface unit, a service application request signal to the integrated control server through the communication unit, and receives a corresponding service application from the integrated control server and stores the received service application in the storage unit; and a service execution controlling unit extracting, when execution of at least one service application among service applications stored in the storage unit is requested, information on the execution requested service application from the storage unit to provide a corresponding service.

The intelligent service robot further includes a context recognizing unit recognizing at least one context information among a service context a surrounding context, and user information and transmits the recognized context information to the service execution controlling unit and the integrated control server, wherein the service execution controlling unit decides a required operation based on the context information from the context recognizing unit and acquires a service scenario and a content depending on a corresponding operation from the storage unit to perform the corresponding operation.

The service application includes a recognition application constituted by recognition technology acquiring context information when the intelligent service robot performs a specific-purpose service, a service scenario application corresponding to robot intelligence which stepwise provides a robot service according to the recognition application information, and a content application used to express a unit scenario.

The service application request signal includes user identification information, intelligent service robot identification information, and service application identification information downloading-requested by a user.

When execution of a service application selected through the user interface unit is requested, the service execution control unit calls a service scenario mapped with identification information of the selected service application from the storage unit and calls a content for operating according to the called scenario from the storage unit to provide a service corresponding to the service application.

The intelligent service robot further includes a scenario editing unit editing an event, an action, and a context constituting the service scenario stored in the storage unit and editing one service scenario through connection among contexts.

The intelligent service robot further includes an advertisement information storing unit storing advertisement information including an advertisement, advertiser identification information, and advertisement identification information; an output unit outputting the advertisement; and an advertisement execution controlling unit controlling an advertisement stored in the advertisement information storing unit or an advertisement received from the integrated, control server through the communication unit to be output through the output unit.

The advertisement execution controlling unit transmits advertisement output information including the number of output times, advertisement identification information, and advertises identification information of each advertisement to the integrated control server through the communication unit.

According to yet another, aspect of the present invention, there is provided an integrated control server, including: a communication unit performing communication with an intelligent service robot through a communication network; a robot information database storing robot identification information, user identification information, an operating state, robot product information, and a robot content for a plurality of respective intelligent service robots; an application database storing a service application; a robot information monitoring unit monitoring context information of the plurality of intelligent service robots connected through the communication unit in real time to update the robot information database; a subscriber authenticating unit searching the robot information database to perform authentication of a corresponding user when a service application request signal is received from the intelligent service robot through the communication unit; and an application providing unit judging whether service application identification information included in the service application request signal is present in the application database when the corresponding user is an authenticated user according to an authentication result of the subscriber authenticating unit, and acquiring a corresponding service application from the application database according to the judgment result and providing the acquired service application to the intelligent service robot.

The integrated control server further includes: a robot service managing unit receiving operating result and state information for each service application from each intelligent service robot, and storing and statistically digitizing the result and state information and calculating and adjusting a priority of services performed by the intelligent service robot to continuously update and manage an optimal service application suitable for a context.

The integrated control server further includes: a scenario editing unit editing receiving a service scenario and a content for a corresponding service application from an operator or a provider and registering the received service scenario and content in the application service or editing the service scenario stored in the application database to update the application database.

The application providing unit acquires the service application from the application database and providing the acquired service application to the intelligent, service robot when the service application identification information is present in the application database and outputs a service application registration request signal requesting new registration of the service application when the service application identification information is not present in the application database.

The service application includes a recognition application constituted by recognition technology acquiring context information when the intelligent service robot performs a specific-purpose service, a service scenario application corresponding to robot intelligence which stepwise provides a robot service according to the recognition application information, and a content application used to express a unit scenario.

The integrated control server further includes: an advertisement information database storing advertise identification information and advertisement identification information for each advertisement; and an advertisement controlling unit paying, when advertisement output information is received from the intelligent service robot through the communication unit, a predetermined amount of money to a corresponding advertiser based on the number of output times in the advertisement output information.

The advertisement controlling unit registers a corresponding advertisement in the advertisement information database when advertisement registration is requested from the advertiser.

According to yet another aspect of the present invention, there is provided a method for operating a smart service robot, including the steps of: (a) transmitting a service application request signal to an integrated control server when an intelligent service robot receives a service application downloading request command; (b) performing, by the integrated control server, user authentication by searching a robot information database and judging whether service application identification information included in the service application request signal is, present in an application database when a corresponding user is an authenticated user; (c) acquiring a service application mapped with the service application identification information from the application database and transmitting the acquired service application to the intelligent service robot when the service application identification information is present in the application database according to the judgment result of step (b); and (d) receiving and storing, by the intelligent service robot, the service application.

The method for operating a smart service robot further includes: after step (d), calling, by the intelligent service robot, a service scenario mapped with identification information of a corresponding service application from a storage unit when execution of a specific service application is requested, and calling a content for operating according to the called scenario from the storage unit to provide a service corresponding to the service application.

The service application request signal includes user identification information, intelligent service robot identification information, and service application identification information downloading-requested by a user.

Step (e) further includes outputting, by the integrated control server, a service application registration request signal to request new registration of the service application when the service application identification information is not present in the application database according to the judgment result of step (b); and receiving, by the integrated control server, a service scenario and a content for the service application of which new registration is requested from an operator or a provider and registering the received service scenario and content in the application database.

Effect of the Invention

As described above, according to the present invention, when a user who is using an intelligent service robot requires an application for a specific purpose associated with an operation of the intelligent service robot, the user easily downloads the application online and applies the downloaded application to his/her own intelligent service robot to optimize and use a service provided by the robot according to a usage.

Further, the intelligent service robot can be used as various intelligent robots such as various services, for example, a guide assistant robot, an entertainment robot, an education robot, an advertising publicity robot, a security robot, an event assistant robot, a robot MC, and the like by using one intelligent service robot.

Further, a robot service integration and development environment capable of making a database of various service applications optimized for an actual condition of a service field according to user's needs, storing and evaluating, managing and updating the various service applications regardless of a feature of a robot is developed, and business is created through propagation and spread of the robot service integration and development environment to activate a robot industry.

MODE FOR CARRYING OUT THE INVENTION

Details of the aforementioned objects and technical configurations, and the resulting acting effects will be more clearly appreciated by a detailed description with reference to the accompanying drawings of the specification of the present invention.

Figure 1:
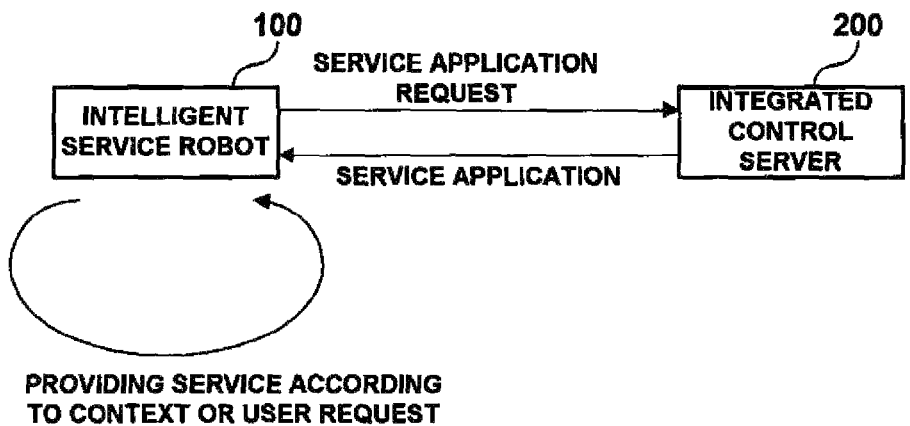
FIG. 1 is a diagram illustrating a system for operating a smart service robot according to the present invention.

FIG. 1 is a diagram illustrating a system for operating a smart service robot according to the present invention.

Referring to FIG. 1, a system for operating a smart service robot includes an intelligent service robot 100 recognizing context information and transmitting the recognized context information to an integrated control server 200 and the integrated control server 200 remotely monitoring the intelligent service robot 100.

When a user requests downloading of a specific service application, the intelligent service robot 100 transmits a service application request signal to the integrated control server 200 to receive and store the corresponding service application.

Herein, the service application request signal includes user identification information (for example, ID/password), intelligent service robot identification information, identification information of a service application selected by the user, and the like. The service application includes a recognition application constituted by recognition technology acquiring environment and user information when the intelligent service robot performs a specific-purpose service, a service scenario application corresponding to robot intelligence which stepwise provides a robot service according to the recognition application information, and a content application used to express a unit scenario.

For example, the service application represents providing services including a guide, an education, a silver care, and the like and the intelligent service robot provides the corresponding service by calling a corresponding content according to a service scenario.

The content application is constituted by robot-unit expression functions (for example, a mention, a gesture, sound, mobile, display, an LED, facial emotion expression, and the like) so as for the intelligent service robot to operate according to the robot service scenario and means robot expression by a unit expression function or a complex expression function according to a service context. For example, an expression function of the robot may be diversified and updated by combining a greeting, an operation, the sound, the LED, and the like when the intelligent service robot takes a bow or storing, changing, and updating unit expressions with the content application.

Further, the intelligent servicer robot 100 provides a service corresponding to a pre-stored service application according to a user request. That is, the intelligent service robot 100 downloads a service application including a service scenario and a content from the integrated control server 200 to utilize the downloaded service application in various fields.

In other words, one intelligent service robot may be used as various intelligent robots such as a cleaning robot, a public office guide robot, an education robot, and the like that provide various services.

That is, as the use a smart phone is diversified by an application having various functions or usages and an application that meets needs of a user and a market is shared through a network and newly manufactured to enable individual customization of global tens of millions of smart phones, the intelligent service robot 100 is used to improve the use of the robot which meets the needs of the user and the market by grafting applications having various functions or usages onto the robot intelligence, the mobile, recognition, and expressions (speech, gesture, sound, and the like).

Accordingly, when a new robot service is required in a service field, the intelligent service robot 100 downloads a corresponding service application from the integrated control server and provides the corresponding service.

Further, the intelligent service robot 100 stores advertisement information and thereafter, outputs a corresponding advertisement according to an advertisement schedule and transmits to the integrated control server advertisement output information including the number of output times, advertisement identification information, and advertiser identification information of each advertisement.

As such, the intelligent servicer robot 100 may download from the integrated control server 200 various service applications that provide an application service such as a silver care service, a baby-sitting service, a pet care service, a housekeeper service, an edutainment service, a multimedia reproducing service, or a security service and provide various services corresponding to the downloaded service applications.

Further, the intelligent servicer robot 100 senses surrounding context information and decides a required robot operation based on a sensing result to perform the corresponding operation. That is, the intelligent servicer robot 100 receives environment information such as image information or voice information by using a sensor such as a camera sensor, an infrared sensor or a microphone corresponding to human eye or ear, judges a current context through a processor installed with artificial intelligence, and performs an appropriate operation based thereon.

Only one intelligent service robot is illustrated herein, but a plurality of intelligent service robots may be provided.

The intelligent service robot 100 that performs the aforementioned roles will be described in detail with reference to FIG. 2.

When the integrated control server 200 receives a service application request signal from the intelligent service robot 100, the integrated control server 200 acquires a service application mapped with service application identification information included in the service application request signal from an application database and provides the service application to the intelligent service robot 100.

Further, the integrated control server 200 monitors context information including an operating state, a service context, and the like of the intelligent service robot 100 in real time.

Further, the integrated control server 200 receives result and state information operated for each service application from each intelligent service robot, and stores and statistically digitizes the result and state information and calculates and adjusts a priority of services performed by the intelligent service robot 100 by evaluating satisfaction, utilization, and conformity for the services to continuously update and manage an optimal service application suitable for a context.

Further, the integrated control server 200 may edit a pre-stored robot service scenario.

Further, when the integrated control server 200 stores advertiser identification information and advertisement identification information for each advertisement and receives advertisement output information from the intelligent service robot, a predetermined amount of money, may be paid to, a corresponding advertiser based on the number of output times in the advertisement output information.

The intelligent service robot 200 that performs the aforementioned roles will be described in detail with reference to FIG. 3.

Figure 2:
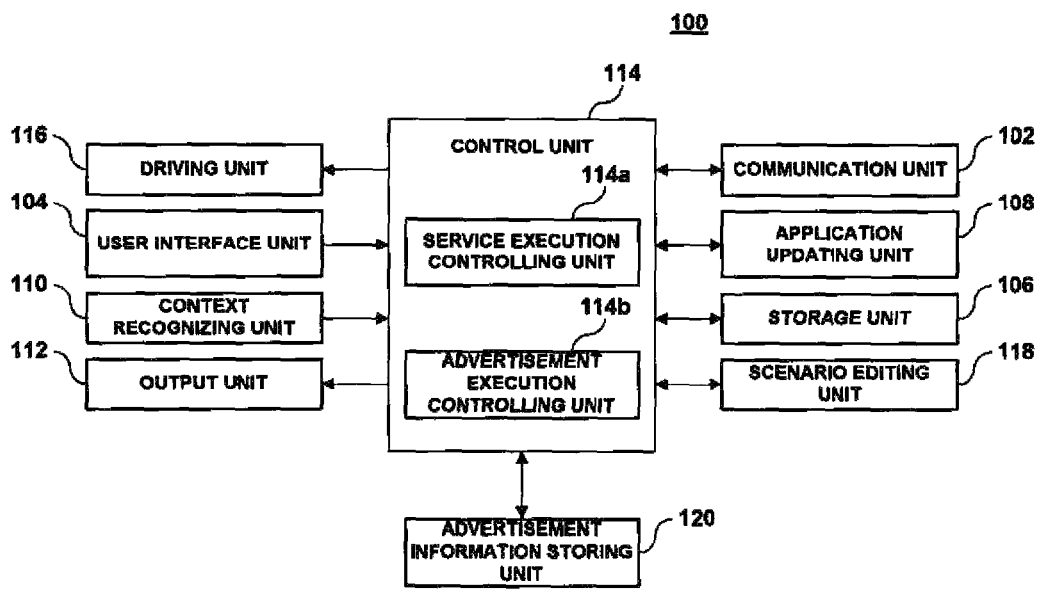
FIG. 2 is a block diagram schematically illustrating a configuration of an intelligent service robot according to the present invention.

FIG. 2 is a block diagram schematically illustrating a configuration of an intelligent service robot according to the present invention.

Referring to FIG. 2, the intelligent service robot 100 includes a communication unit 102, a user interface unit 104, a storage unit 106, an application updating unit 108, a context recognizing unit 110, an output unit 112, a control unit 114, and a driving unit 116.

The communication unit 102 performs communication with the integrated control server through a wired communication network or a wireless communication network.

The user interface unit 104 receives a service application downloading request command for a new robot service from a user.

The user interface unit 104 represents a keyboard, a touch panel, an LCD panel, and the like and may serve as the output unit.

The service application downloaded from the integrated control server through the communication unit 102 is stored in the storage unit 106. That is, service application identification information, a service scenario for executing a corresponding application, and a content required to operate the scenario are stored in the storage unit 106 in a package form.

The service application includes a recognition application constituted by recognition technology acquiring environment and user information when the intelligent service robot 100 performs a specific-purpose service, a service scenario application corresponding to robot intelligence which stepwise provides a robot service according to the recognition application information, and a content application used to express a unit scenario.

Further, the service application means providing services including a guide, an education, a silver care, and the like and the content represents a voice, a mention, a motion, a facial expression, sound, and the like so as for the intelligent service robot 100 to operate according to the service scenario.

The context recognizing unit 110 recognizes context information including its own operating state, a service context, a surrounding context, user information, and the like to transmit the recognized context information to the integrated control server with the control unit 114 through the communication unit 102.

The context recognizing unit 110 may be the sensor such as the camera sensor, the infrared sensor, the microphone, or the like corresponding to the human eye or ear. The respective sensors of the context recognizing unit 110 may be turned on/off according to setting a service environment variable or operate in a specific mode.

The application updating unit 108 transmits the service application request signal to the integrated control server through the communication unit 102, and receives the corresponding service application from the integrated control server and stores the received service application in the storage unit 106 when a service application downloading request command is input through the user interface unit 104. Herein, the service application downloading request command represents selecting an application for performing a service desired by the user and the service application request signal includes user identification information, intelligent service robot identification information, and identification information of the service application selected by the user.

The control unit 114 acquires, from a request for executing a specific service application, the corresponding service application from the storage unit 106 to control an operation of each unit so as to provide the corresponding service.

The control unit 114 that performs the aforementioned role represents a service execution controlling unit 114a.

When execution of at least one service application is requested among service applications stored in the storage unit 106, the service execution controlling unit 114a extracts provides information on the service application of which execution is requested, from the storage unit 106 to provide the corresponding service. That is, when the user selects a desired service application list through the user interface unit 104 and requests execution of the selected service application list, the service execution controlling unit 114a calls a service scenario mapped with identification information of the selected service application from the storage unit 106 and calls a content for operating according to the called scenario from the storage unit 106 to provide a service corresponding to the service application. Herein, the service includes an education service, a silver service, an advertisement service, and the like.

Further, the service execution controlling unit 114a calls a service scenario corresponding to context information recognized through the context recognizing unit 110 from the storage unit 106 and calls the content for operating according to the called scenario from the storage unit 106 to provide the service corresponding to the corresponding service application.

Further, the service execution controlling unit 114a may control driving of parts such as a body, a head, and an arm and a leg of the intelligent service robot and control outputting of various visual and auditory signals.

The driving unit 116 drives right-wheel and left-wheel motors (not illustrated) according to a control signal output from the control unit 114 to drive the intelligent service robot 310. The right-wheel and left-wheel motors (not illustrated) of the driving unit 116 are connected with left and right wheels to drive the intelligent service robot 100. Accordingly, the intelligent service robot 100 is driven in all directions according to rotational speed and rotational directions of the right-wheel and left-wheel motors.

The intelligent service robot 100 configured as above may further include a scenario editing unit 120 that edits an event, an action, and a context constituting the service scenario and edits one service scenario through connection of contexts. Herein, one service scenario is configured by setting an input event and an action of a robot that operates in response thereto as one context and connecting set situations to each other.

That is, the scenario editing unit 120 edits the event input into the intelligent service robot 100, edits the action of the intelligent service robot 100 for providing the service and thereafter, edits a context by connecting the edited event and action, and provides the robot service scenario provided by the intelligent service robot 100 by connecting the edited context.

In this case, the scenario editing unit 120 edits information such as a user of the intelligent service robot 100, an environment where the intelligent service robot is used, a state of the intelligent service robot 100, and the like as an input event, edits the event so as for the intelligent service robot 100 acts according to information such as an emotion, voice, an act, and the like, edits a context by connecting the edited event and action, and lists and stores a relationship between the connected event and action.

Since various events, actions, and contexts are present, the intelligent service robot 100 forms the events, actions, and contexts as respective scenarios to call and use an appropriate scenario according to user needs.

Further, the intelligent service robot 100 may further include an advertisement information storing unit 118 and an advertisement execution controlling unit 114b.

The advertisement information storing unit 118 stores advertisement information including an advertisement, advertiser identification information, and advertisement identification information.

The advertisement execution controlling unit 114b controls an advertisement stored in the advertisement information storing unit 118 or an advertisement received from the integrated control server through the communication unit 102 to be output through the output unit 112 according to, an advertisement schedule.

In this case, the advertisement execution controlling unit 114b transmits advertisement output information including the number of output times, advertisement identification information, and advertises identification information of each advertisement to the integrated control server through the communication unit 102.

The intelligent service robot 100 configured as above may provide various smart services by using one intelligent service robot. That is, the intelligent service robot 100 may be used as various intelligent robots such as a guide assistant robot, an entertainment robot, an education robot, an advertising publicity robot, a security robot, an event assistant robot, a robot MC, and the like.

Figure 3:
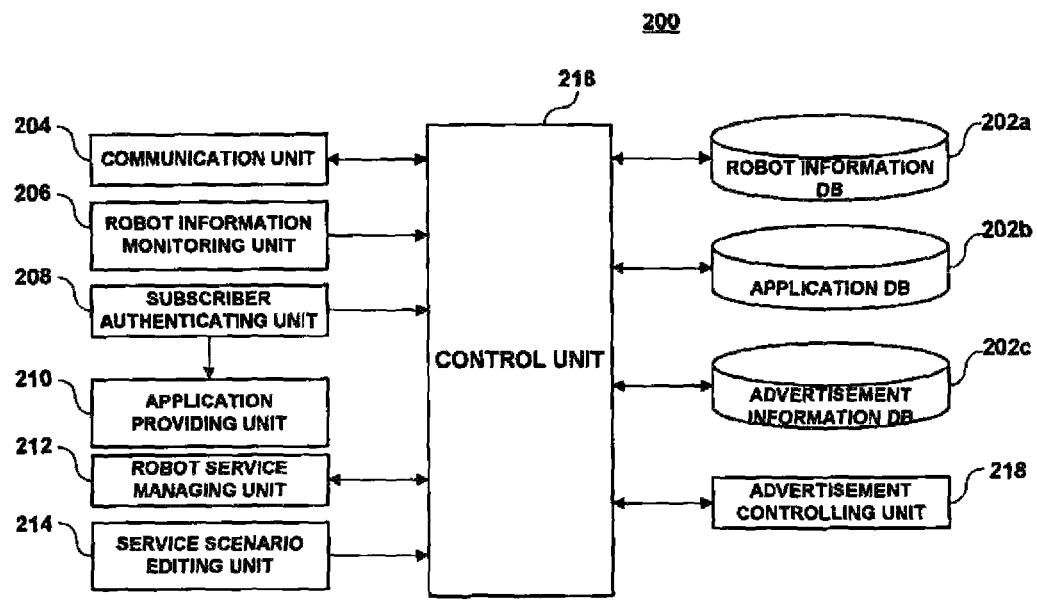
FIG. 3 is a block diagram schematically illustrating a configuration of an integrated control server according to the present invention.

FIG. 3 is a block diagram schematically illustrating a configuration of the integrated control server according to the present invention.

Referring to FIG. 3, an integrated control server 200 includes a communication unit 204, a database 202, a robot information monitoring unit 206, a subscriber authenticating unit 208, an application providing unit 210, a robot service managing unit 212, a service scenario editing unit 214, and a control unit 216 controlling an operation of each unit.

The communication unit 204 performs communication with an intelligent service robot through a wired communication network or a wireless communication network.

The database 202 includes a robot information database 202a and an application database 202b.

The robot information database 202 stores robot configuration information such as robot identification information, user identification information, an operating state, robot product information, a robot content, and the like for a plurality of respective intelligent service robots which are positioned in a long range or a short range.

The application database 202b stores service applications according to various usages or functions. The service application includes a recognition application constituted by recognition technology acquiring environment and user information when the intelligent service robot performs a specific-purpose service, a service scenario application corresponding to robot intelligence which stepwise provides a robot service according to the recognition application, and a content application used to express a unit scenario.

The service application means providing services including a guide, an education, a silver care, and the like and the content application represents a voice, a mention, a motion, a facial expression, sound, and the like so as for the intelligent service robot 100 to operate according to the service scenario.

The robot information monitoring unit 206 monitors context information including operating states, service contexts, and the like of the plurality of intelligent service robots connected through the communication unit 204 in real time and stores the monitored information in the robot information database 202a.

When the subscriber authenticating unit 208 receives a service application request signal from the intelligent service robot through the communication unit 204, the subscriber authenticating unit 208 searches for the robot information database 202a to perform authentication of a corresponding user. That is, the subscriber authenticating unit 208 judges whether the user is an authenticated user by using, whether user identification information or intelligent service robot identification information included in the service application request signal is registered in the robot information database 202a.

When the corresponding user is the authenticated user according to an authentication result of the subscriber authenticating unit 208, the application, providing unit 210 judges whether service application identification information included in the service application request signal is present in the application database 202b and acquires a corresponding service application from the application database 202b based on a result of the judgment and provides the acquired service application to the intelligent service robot.

That is, the application providing unit 210 acquires the service application from the application database 202b and provides the acquired service application when the service application identification information is present in the application database 202b.

If the service application identification information is not preset, the application providing unit 210 outputs a service application registration request signal to request new registration of the service application. The service application registration request signal includes information on the corresponding service application.

Then, an operator or a provider newly prepares a service scenario and a content for the new registration request service application through the service scenario editing unit 214 and registers the prepared scenario and content in the application database 202b.

Further, the application providing unit 210 judges a type of the intelligent service robot by using the intelligent service robot identification information included in the service application request signal, and acquires a service application corresponding to the judged type from the application database to transmit the acquired service application to the intelligent service robot. In this case, the application database 202b stores the service application according to the type of the intelligent service robot. Herein, the type includes a type, a version, and the like of a platform of the intelligent service robot.

Further, when the corresponding service application is present, but the service application corresponding to the type of the intelligent service robot is not present, the application providing unit 210 converts the service application acquired from the application database 202b according to the intelligent service robot to, transmit the converted service application to the intelligent service robot.

The robot service managing unit 212 stores and statistically digitizes operating result and state information for each service application received through the robot information monitoring unit 206 for each period and evaluation index, and calculates and adjusts a priority by evaluating satisfaction, utilization, and suitability for a service performed by the robot to continuously update and manage an optimal service application suitable for a context.

Further, the robot service managing unit 212 stores and digitizes error logs for an operation and an action which are not suitable for the context to reflect and record the corresponding error logs onto the evaluation index.

The robot service managing unit 212 may evaluate and select a best service for each service context based on an operating result of the service application.

When the service scenario editing unit 214 receives an application registration request signal, the service scenario editing unit 214 prepares a service scenario and a content for the corresponding service application to register the prepared service scenario and content in the application database 202b.

Further, the service scenario editing unit 214 sets a context by connecting an event and an action with respect to a pre-stored service scenario, edits the scenario by connecting the set context, and updates the edited scenario onto the application database 202b.

That is, the service scenario editing unit 214 may newly prepare/edit/execute the service scenario of the intelligent service, robot.

The integrated control server 200 configured as above may further include an advertisement information database 202c and an advertisement controlling unit 218.

The advertisement information database 202c stores advertiser identification information and advertisement identification information for each advertisement.

When the advertisement controlling unit 218 receives advertisement output information from the intelligent service robot through the communication unit 204, the advertisement controlling unit 218 pays a predetermined amount of money to a corresponding advertiser based on the number of output times in the advertisement output information.

Further, when advertisement registration is requested from the advertiser, the advertisement controlling unit 218 registers a corresponding advertisement in the advertisement information database 202c.

Figure 4:
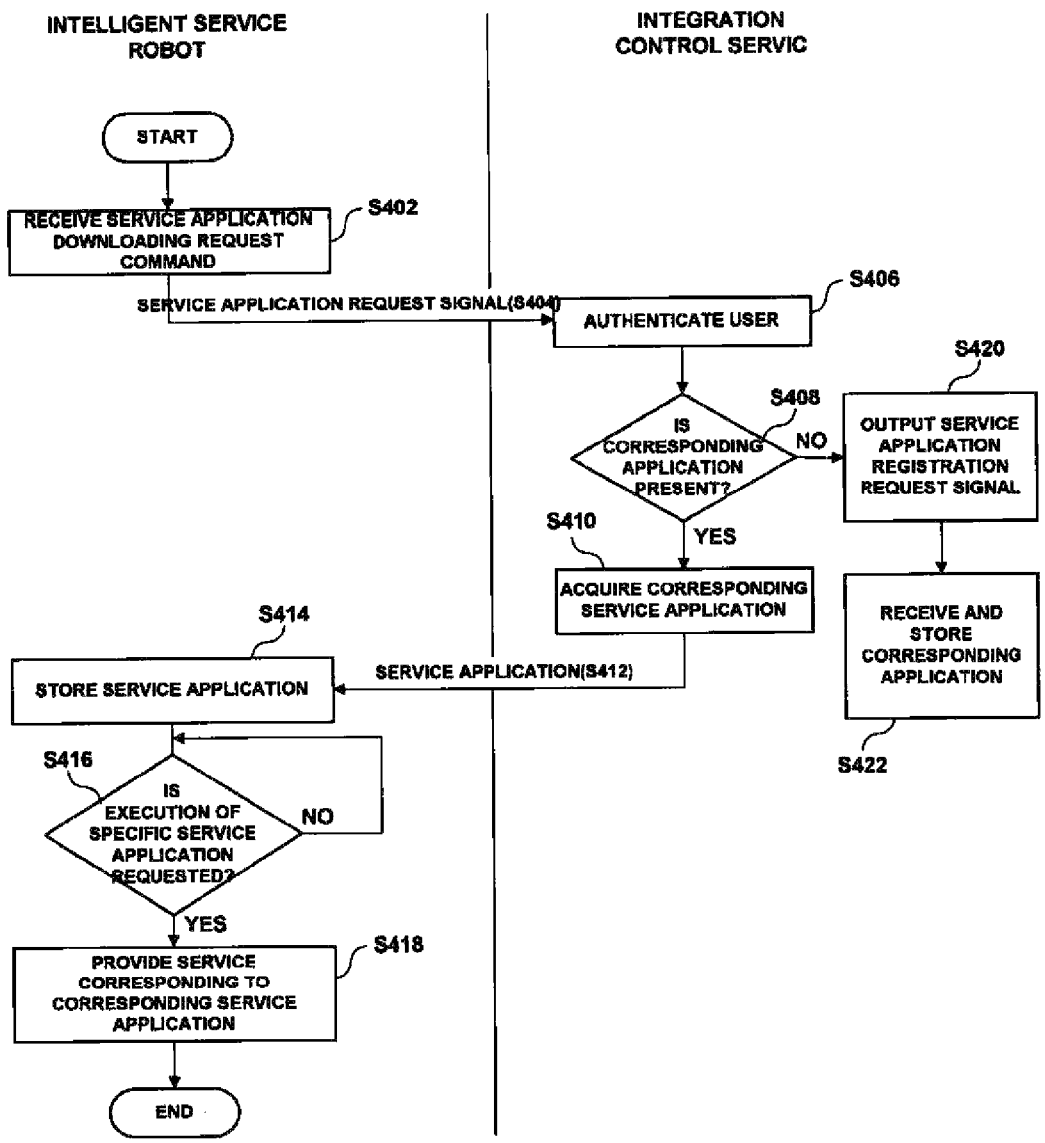
FIG. 4 is a diagram illustrating a method for operating a smart service robot according to the present invention.

FIG. 4 is a diagram illustrating a method for operating a smart service robot according to the present invention.

Referring to FIG. 4, when an intelligent service robot receives a service application downloading request command for a new service from a user (S402), the intelligent service robot transmits a service application request signal to an integrated control server (S404). The service application request signal includes user identification, intelligent service robot identification information, corresponding service application identification information, and the like.

When S404 is performed, the integrated control server searches a robot information database to perform authentication of a corresponding user (S406). That is, the integrated control server judges whether the user is an authenticated user by using whether user identification information or intelligent service robot identification information included in the service application request signal is registered in the robot information database.

When the user is authenticated, the integrated control server judges whether service application identification information included in the service application request signal is present in an application database (S408).

According to a result of the judgment of S408, when the service application identification information is present in the application database, the integrate control server acquires a robot service application mapped with the service application identification information from the application database (S410) to transmit the acquired robot service application to the intelligent service robot (S412).

That is, the integrated control server acquires a robot service application including a scenario and a content mapped with the service application identification information from the application database to transmit the acquired robot service application to the intelligent service robot.

The intelligent service robot receives and stores service application information from the integrated control server (S414).

Hereinafter, when execution of a specific service application is requested (S416), the intelligent service robot provides a service corresponding to the service application of which execution is requested (S418). That is, the intelligent service robot decides a required operation based on context information recognized by a context recognizing unit and execution of the service application by the operation may be requested or execution of a specific service application may be requested from a user.

If the service application identification information is not present in the application database according to a result of the judgment in S408, the integrated control server outputs a service application registration request signal to request new registration of the service application (S420). The service application registration request signal includes information on the corresponding service application.

Then, an operator or a provider newly prepares a service scenario and a content for providing a service corresponding to the service application through a robot service scenario editing unit to register the new service scenario and content in the application database.

Then, the integrated control server receives the service scenario and the content for the service application and maps the received scenario and content with application identification information to store them in the application database (S422).

It will be appreciated by those skilled in the art that the present invention as described above may be implemented into other specific forms without departing from the technical spirit thereof or essential characteristics. Thus, it is to be appreciated that embodiments described above are intended to be illustrative in every sense and not restrictive. The scope of the present invention is represented by the claims to be described below rather than the detailed description, and it is to be interpreted that the meaning and scope of the claims and all the changes or modified forms derived from the equivalents thereof come within the scope of the present invention.

INDUSTRIAL APPLICABILITY

The present invention can be applied to a system and a method for operating a smart service robot in which a user who is using an intelligent service robot easily downloads a service application for a specific purpose associated with an operation of the intelligent service robot online and executes the downloaded service application through an application execution engine incorporated in the robot to provide a service optimized for various environments and usages.

The invention claimed is:

1. A system for operating a smart service robot, comprising:
    an integrated control server storing and managing a plurality of service applications, and providing a corresponding service application according to a specific service application request from an intelligent service robot; and
    at least one intelligent service robot requesting and downloading the specific service application onto the integrated control server to provide the corresponding service,
    wherein the integrated control server receives operating result and state information for each service application from each intelligent service robot, and stores and statistically digitizes the result and state information and calculates and adjusts a priority of services by the intelligent service robot by evaluating satisfaction, utilization, and conformity for the services to continuously update and manage an optimal service application suitable for a context.

2. The system for operating a smart service robot of claim 1, wherein:
    the integrated control server judges whether corresponding service application identification information is present in an application database according to a service application request from the intelligent service robot and acquires the service application from the application database and provides the acquired service application to the intelligent service robot when the corresponding service application identification information is present in the application database.

3. The system for operating a smart service robot of claim 2, wherein:
    the integrated control server outputs a service application registration request signal to request new registration of the service application when the corresponding service application identification information is not present in the application database.

4. The system for operating a smart service robot of claim 3, wherein:
    the integrated control server maps a service scenario application and a content application newly prepared by an operator or a provider with the service application identification information to register the mapped service scenario application and content application, and the service application identification information in the application database.

5. An intelligent service robot comprising:
    a communication unit performing communication with an integrated control server through a communication network;
    a storage unit storing service applications downloaded from the integrated control server through the communication unit;
    a user interface unit receiving a service application downloading request command from a user;
    an application updating unit transmitting, when the service application downloading request command is input through the user interface unit, a service application request signal to the integrated control server through the communication unit, and receives a corresponding service application from the integrated control server and stores the received service application in the storage unit; and
    a service execution controlling unit extracting, when execution of at least one service application among service applications stored in the storage unit is requested, information on the execution requested service application from the storage unit to provide a corresponding service,
    wherein the service application includes a recognition application constituted by recognition technology acquiring context information when the intelligent service robot performs a specific-purpose service, a service scenario application corresponding to robot intelligence which stepwise provides a robot service according to the recognition application information, and a content application used to express a unit scenario.

6. The intelligent service robot of claim 5, further comprising:
    a context recognizing unit recognizing at least one context information among a service context, a surrounding context, and user information and transmits the recognized context information to the service execution controlling unit and the integrated control server, wherein the service execution controlling unit decides a required operation based on the context information from the context recognizing unit and acquires a service scenario and a content depending on a corresponding operation from the storage unit to perform the corresponding operation.

7. The intelligent service robot of claim 5, wherein:
the service application request signal includes user identification information, intelligent service robot identification information, and service application identification information downloading-requested by a user.

8. The intelligent service robot of claim 5, wherein:
when execution of a service application selected through the user interface unit is requested, the service execution control unit calls a service scenario mapped with identification information of the selected service application from the storage unit and calls a content for operating according to the called scenario from the storage unit to provide a service corresponding to the service application.

9. The intelligent service robot of claim 5, further comprising:
a scenario editing unit editing an event, an action, and a context constituting the service scenario stored in the storage unit and editing one service scenario through connection among contexts.

10. The intelligent service robot of claim 5, further comprising:
an advertisement information storing unit storing advertisement information including an advertisement, advertiser identification information, and advertisement identification information;
an output unit outputting the advertisement; and
an advertisement execution controlling unit controlling an advertisement stored in the advertisement information storing unit or an advertisement received from the integrated control server through the communication unit to be output through the output unit.

11. The intelligent service robot of claim 10, wherein:
the advertisement execution controlling unit transmits advertisement output information including the number of output times, advertisement identification information, and advertise identification information of each advertisement to the integrated control server through the communication unit.

12. An integrated control server comprising:
a communication unit performing communication with an intelligent service robot through a communication network;
a robot information database storing robot identification information, user identification information, an operating state, robot product information, and a robot content for a plurality of respective intelligent service robots;
an application database storing a service application;
a robot information monitoring unit monitoring context information of the plurality of intelligent service robots connected through the communication unit in real time to update the robot information database;
a subscriber authenticating unit searching the robot information database to perform authentication of a corresponding user when a service application request signal is received from the intelligent service robot through the communication unit; and
an application providing unit judging whether service application identification information included in the service application request signal is present in the application database when the corresponding user is an authenticated user according to an authentication result of the subscriber authenticating unit, and acquiring a corresponding service application from the application database according to the judgment result and providing the acquired service application to the intelligent service robot,
wherein the application providing unit acquires the service application from the application database and providing the acquired service application to the intelligent service robot when the service application identification information is present in the application database, and outputs a service application registration request signal requesting new registration of the service application when the service application identification information is not present in the application database.

13. The integrated control server of claim 12, further comprising:
a robot service managing unit receiving operating result and state information for each service application from each intelligent service robot, and storing and statistically digitizing the result and state information and calculating and adjusting a priority of services performed by the intelligent service robot to continuously update and manage an optimal service application suitable for a context.

14. The integrated control server of claim 12, further comprising:
a scenario editing unit editing receiving a service scenario and a content for a corresponding service application from an operator or a provider and registering the received service scenario and content in the application service or editing the service scenario stored in the application database to update the application database.

15. The integrated control server of claim 12, wherein:
the service application includes a recognition application constituted by recognition technology acquiring context information when the intelligent service robot performs a specific-purpose service, a service scenario application corresponding to robot intelligence which stepwise provides a robot service according to the recognition application information, and a content application used to express a unit scenario.

16. The integrated control server of claim 12, further comprising:
an advertisement information database storing advertise identification information and advertisement identification information for each advertisement; and
an advertisement controlling unit paying, when advertisement output information is received from the intelligent service robot through the communication unit, a predetermined amount of money to a corresponding advertiser based on the number of output times in the advertisement output information.

17. The integrated control server of claim 16, wherein:
the advertisement controlling unit registers a corresponding advertisement in the advertisement information database when advertisement registration is requested from the advertiser.

18. A method for operating a smart service robot, comprising the steps of:
(a) transmitting a service application request signal to an integrated control server when an intelligent service robot receives a service application downloading request command;

(b) performing, by the integrated control server, user authentication by searching a robot information database and judging whether service application identification information included in the service application request signal is present in an application database when a corresponding user is an authenticated user;

(c) acquiring a service application mapped with the service application identification information from the application database and transmitting the acquired service application to the intelligent service robot when the service application identification information is present in the application database according to the judgment result of step (b), and outputting, by the integrated control server, a service application registration request signal to request new registration of the service application when the service application identification information is not present in the application database according to the judgment result of step (b); and (d) receiving and storing, by the intelligent service robot, the service application.

19. The method for operating a smart service robot of claim 18, further comprising:

after step (d), calling, by the intelligent service robot, a service scenario mapped with identification information of a corresponding service application from a storage unit when execution of a specific service application is requested, and calling a content for operating according to the called scenario from the storage unit to provide a service corresponding to the service application.

20. The method for operating a smart service robot of claim 18, wherein:

the service application request signal includes user identification information, intelligent service robot identification information, and service application identification information downloading-requested by a user.

21. The method for operating a smart service robot of claim 18, wherein:

step (c) further includes, receiving, by the integrated control server, a service scenario and a content for the service application of which new registration is requested from an operator or a provider and registering the received service scenario and content in the application database.

* * * * *